(12) United States Patent
Zeng et al.

(10) Patent No.: US 9,993,019 B2
(45) Date of Patent: Jun. 12, 2018

(54) METHOD FOR MAKING PARTICLE OF A HYDROPHOBIC ADDITIVE AND A POLYSACCHARIDE COATING AND TOBACCO PRODUCTS CONTAINING PARTICLE OF A HYDROPHOBIC ADDITIVE AND A POLYSACCHARIDE COATING

(75) Inventors: Yi Zeng, Richmond, VA (US); Shuzhong Zhuang, Richmond, VA (US); Georgios D. Karles, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 742 days.

(21) Appl. No.: 12/748,227

(22) Filed: Mar. 26, 2010

(65) Prior Publication Data
US 2011/0232656 A1 Sep. 29, 2011

(51) Int. Cl.
| | |
|---|---|
| *A24B 13/00* | (2006.01) |
| *A24B 15/28* | (2006.01) |
| *A24D 1/00* | (2006.01) |
| *A24D 3/04* | (2006.01) |
| *A23L 27/00* | (2016.01) |

(52) U.S. Cl.
CPC ............ *A24B 15/283* (2013.01); *A23L 27/72* (2016.08); *A24B 13/00* (2013.01); *A24D 1/002* (2013.01); *A24D 3/048* (2013.01)

(58) Field of Classification Search
None
See application file for complete search history.

(56) References Cited

U.S. PATENT DOCUMENTS

| | | | |
|---|---|---|---|
| 3,971,852 A | 7/1976 | Brenner et al. | |
| 4,675,189 A | 6/1987 | Kent et al. | |
| 4,889,144 A | 12/1989 | Tateno et al. | |
| 4,908,154 A * | 3/1990 | Cook et al. ..................... 516/21 |
| 4,921,705 A | 5/1990 | Arai et al. | |
| 4,966,171 A | 10/1990 | Serrano et al. | |
| 5,124,162 A | 6/1992 | Boskovic et al. | |

(Continued)

FOREIGN PATENT DOCUMENTS

| | | |
|---|---|---|
| JP | S57-118512 A | 7/1982 |
| JP | S64-60363 A | 3/1989 |

(Continued)

OTHER PUBLICATIONS

International Preliminary Report on Patentability dated Oct. 11, 2012 for PCT/EP2011/001505.

(Continued)

*Primary Examiner* — Michael J Felton
(74) *Attorney, Agent, or Firm* — Buchanan Ingersoll & Rooney PC (57) ABSTRACT

A method for providing particles of encapsulated flavorants or chemesthetic agents comprises forming an emulsion comprising: (i) a first aqueous solution, comprising one or more polysaccharides; and (ii) a hydrophobic additive; atomizing said emulsion in an atomizer into droplets; introducing said droplets into a second aqueous solution, comprising one or more metal cations, to form particles comprising one or more cross-linked polysaccharides and said additive encapsulated therein; and removing said particles from said second aqueous solution and drying said particles.

23 Claims, 4 Drawing Sheets

(56) References Cited

U.S. PATENT DOCUMENTS

| | | |
|---|---|---|
| 5,143,098 A | 9/1992 | Rogers et al. |
| 5,388,594 A | 2/1995 | Counts et al. |
| 5,499,636 A | 3/1996 | Baggett, Jr. et al. |
| 5,529,789 A * | 6/1996 | Lo .................................. 424/473 |
| 5,531,735 A | 7/1996 | Thompson |
| 5,666,976 A | 9/1997 | Adams et al. |
| 5,692,525 A | 12/1997 | Counts et al. |
| 5,692,526 A | 12/1997 | Adams et al. |
| 5,759,599 A | 6/1998 | Wampler et al. |
| 5,915,387 A | 6/1999 | Baggett, Jr. et al. |
| 5,988,176 A | 11/1999 | Baggett, Jr. et al. |
| 6,026,820 A | 2/2000 | Baggett, Jr. et al. |
| 6,033,888 A * | 3/2000 | Batich et al. ................. 435/178 |
| 6,325,859 B1 | 12/2001 | De Roos et al. |
| 6,709,650 B1 | 3/2004 | Sutton et al. |
| 6,767,637 B2 | 7/2004 | Park et al. |
| 7,235,261 B2 | 6/2007 | Smith et al. |
| 2,301,659 A1 | 6/2011 | Tanaka et al. |
| 2002/0064541 A1 | 5/2002 | Lapidot et al. |
| 2006/0090769 A1 | 5/2006 | Woodson et al. |
| 2006/0144412 A1 * | 7/2006 | Mishra et al. ................. 131/337 |
| 2006/0154850 A1 | 7/2006 | Quellet et al. |
| 2006/0174901 A1 * | 8/2006 | Karles et al. ................. 131/337 |
| 2006/0292280 A1 * | 12/2006 | Soper et al. ................. 426/534 |

FOREIGN PATENT DOCUMENTS

| | | |
|---|---|---|
| JP | 2001-507925 A | 6/2001 |
| JP | 2003-534249 A | 11/2003 |
| WO | 2009/015142 A2 | 1/2009 |
| WO | WO 2009/056609 A1 | 5/2009 |

OTHER PUBLICATIONS

Atomization, Concept and Theory Training, 1995 Graco, Inc. Form No. 321-027 Aug. 1995.

International Search Report and Written Opinion dated Aug. 23, 2011 for PCT/EP2011/001505.

Office Action (Decision of Final Rejection) dated Jan. 25, 2016, by the Japanese Patent Office in corresponding Japanese Application No. 2013-500398, and an English translation. (8 pages).

Kubo et al., Dictionary of Physics and Chemistry, Iwanami Shoten, Oct. 12, 1987, 4th edition, p. 143 "Emulsion" and p. 939 "Emulsifying Agent". (6 pages).

* cited by examiner

METHOD FOR MAKING PARTICLE OF A HYDROPHOBIC ADDITIVE AND A POLYSACCHARIDE COATING AND TOBACCO PRODUCTS CONTAINING PARTICLE OF A HYDROPHOBIC ADDITIVE AND A POLYSACCHARIDE COATING

SUMMARY

A method for providing tobacco products including particles of encapsulated flavorants or chemesthetic agents, comprising:
  (a) forming an emulsion comprising:
    (i) a first aqueous solution, comprising one or more polysaccharides; and
    (ii) a hydrophobic additive;
  (b) atomizing said emulsion in an atomizer into droplets;
  (c) introducing said droplets into a second aqueous solution, comprising one or more metal cations, to form particles comprising one or more cross-linked polysaccharides and said additive encapsulated therein;
  (d) removing said particles from said second aqueous solution;
  (e) drying said particles; and
  (f) adding a quantity of said dried particles to one or more of a smoking article and oral pouch products.

DETAILED DESCRIPTION

When additive materials, in particular, flavorants and/or chemesthetic agents, such as menthol, are incorporated into smoking articles, such as by incorporation into the rod of smoking composition in cigarettes, the premature release and migration of the additive can become problematic. Because the additive materials are often volatile, they can migrate and/or escape from the cigarette during manufacture or storage, so that when the user smokes the cigarette, the desired effect of the additive can be decreased, resulting in a less desirable experience. In order to attempt to compensate for this loss of additive, manufacturers often include more additive material in the cigarette, which adds to the cost thereof. In addition, in smoking articles that have filter systems containing sorbents, such as activated carbon, migration of additives to the sorbent, and sorption thereon, can both decrease the amount of additive available to the user, and result in a decreased level of sorption sites available for the removal of targeted constituents.

The method described herein, the encapsulated additives produced by this method, and smoking articles containing these encapsulated additives, attempt to minimize or reduce these potential problems with additive migration.

In one embodiment described herein, the method of encapsulating an additive involves producing one or more particles within which one or more additives have been encapsulated. In a particular embodiment, these particles can be in the form of powders, granules, agglomerations, or combinations of these. In a particular embodiment, the particles contains a matrix of one or more cross-linked polysaccharides, within which is encapsulated one or more additive materials.

More particularly, in one embodiment, the method of producing the particles includes (a) forming an emulsion containing a first aqueous solution, which in turn contains one or more cross-linkable polysaccharides, and also containing a additive; (b) atomizing said emulsion using a spray atomizer into a second aqueous solution, said second aqueous solution comprising one or more metal cations; and (c) cross-linking at least a portion of said one or more cross-linkable polysaccharides, thereby forming a cross-linked particles comprising cross-linked polysaccharide and additive encapsulated therein.

As used herein, the term "emulsion" denotes a stable mixture of two or more immiscible liquids held in suspension. An emulsion may, but need not, include added emulsifier.

As used herein, the term "aqueous solution" denotes a solution where the solvent contains, but need not be limited to, water.

As used herein, the term "cross-linkable polysaccharide" denotes a combination of monosaccharides linked together by glycosidic bonds, and capable of being cross-linked by an appropriate cross-linking agent. The term is intended to include polysaccharides such as pectins, alginates, and carageenans, which are cross-linkable by monovalent or polyvalent metal cations. Particularly suitable cross-linking metal cations include sodium ions, potassium ions, calcium ions, and aluminum ions.

As used herein, the term "additives" denotes a material included in a smoking article to modify one or more characteristics of the smoke obtained when a smokable composition is heated or combusted. The term is intended to include flavorant agents, such as menthol, and oil-based flavorants, such as peppermint oil, spearmint oil, rosemary oil, cherry oil, citrus flavorants, and wintergreen type flavorants, such as methyl- or ethyl salicylates, and the like. In a particularly advantageous embodiment, the additive comprises a flavorant agent. Menthol is a particularly preferred flavorant agent for encapsulation as described herein. Citrus flavorants are also particularly suitable, as they typically have a shorter shelf life which can be prolonged by the methods and compositions disclosed herein.

As used herein, the term "atomizing" denotes a process whereby a liquid or gel, which may contain molten material, a solution, an emulsion, or a combination of these, is caused to flow through one or more orifices in a sprayer, and broken into droplets.

As used herein, the term "particle" denotes a solid, gel, or semisolid material having a relatively small size. Desirably, the particle is a solid, free-flowing powder having a moisture content of less than about 4% by weight.

As used herein, the term "metal cation" denotes a metal cation of a metallic element that is capable of cross-linking a cross-linkable polysaccharide. The term is intended to include monovalent and polyvalent metal cations, as well as cations that can take more than one valency. The term is particularly intended to include the cations of elements in Groups 1, 2, 8, 11, 12, and 13 of the Periodic Table, and particularly intended to include sodium, potassium, calcium, magnesium, and aluminum cations.

Figure 1:
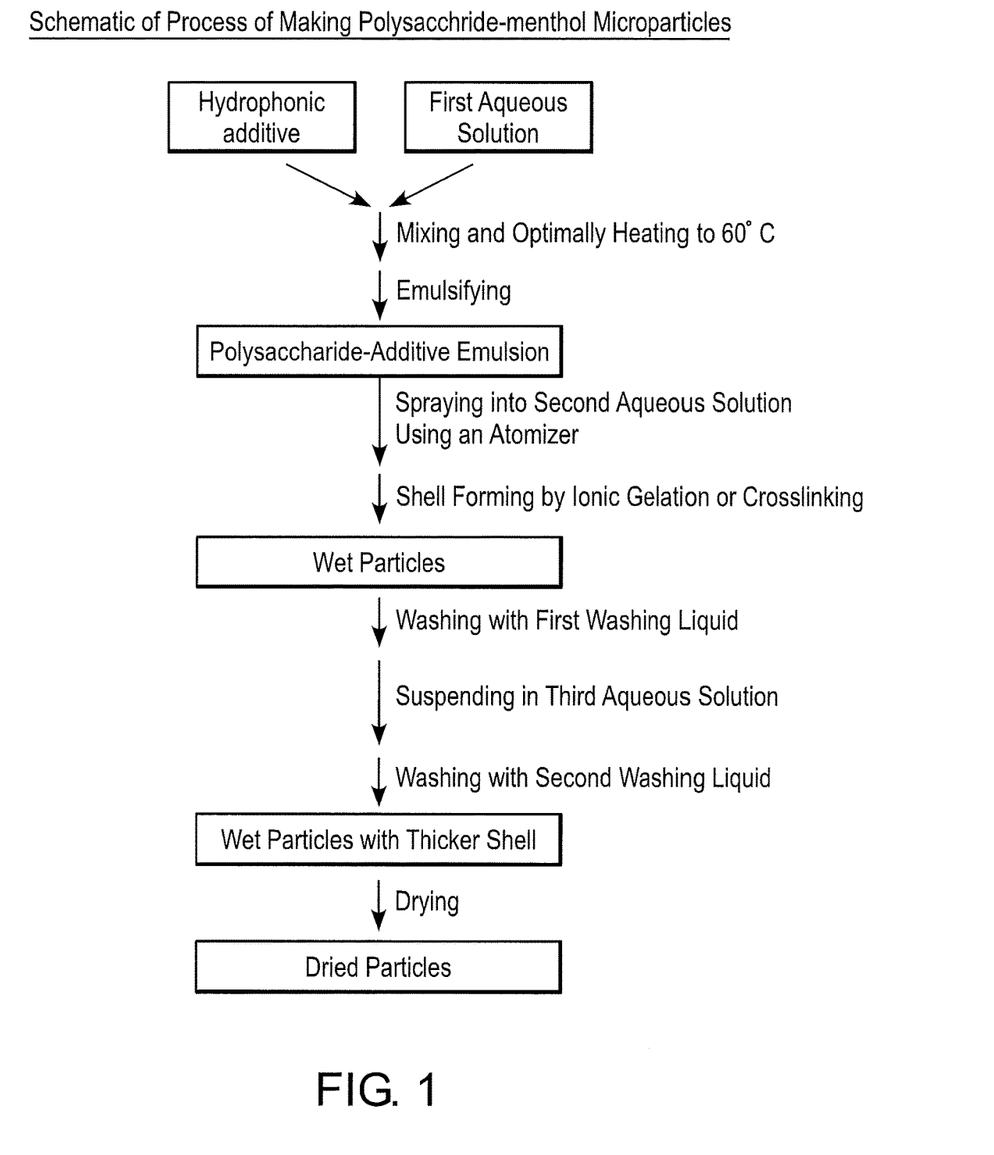
FIG. 1 is a flowchart schematically illustrating one embodiment of a process for making microparticles as described herein.

An exemplary embodiment of the method described herein is presented with reference to FIG. 1. This Figure provides a flowchart that schematically illustrates the preparation of polysaccharide-menthol microparticles; however, the steps illustrated are equally applicable to the preparation of polysaccharide microparticles containing other flavorants, which can be substituted for some or all of the menthol in the flowchart.

As indicated in FIG. 1, a hydrophobic additive, such as menthol or other flavorant, is added to a first aqueous solution comprising one or more polysaccharides, and the resulting mixture is heated (e.g., to about 60 C) or otherwise processed to form an emulsion (e.g., by high speed mixing in a homogenizer). One or more emulsifying agents may be added to increase the stability or ease of formation of the resulting emulsion, if desired or necessary.

The resulting polysaccharide-additive emulsion is then sprayed through an atomizer into a second aqueous solution, which can contain calcium chloride or other metal cations, which are capable of causing ionic gelation or crosslinking of at least some of the polysaccharides present in the emulsion. The atomizer breaks up the bulk liquid emulsion into droplets of appropriate size to form particles, in particular microparticles having an average diameter ranging between about 400 µm and about 550 µm, even more particularly around 479 µm. The atomizer typically results in a spray of droplets having more or less spherical shapes, which shapes result primarily from the surface tension of the liquid emulsion in the droplet. Several different types of atomizer can be used to obtain the spray of droplets, including pressure (or airless) atomization, air atomization, centrifugal atomization, electrostatic atomization, and ultrasonic atomization.

Pressure, or airless, atomization uses relatively high pressure to force a liquid through a small nozzle, resulting in a stream or sheet of liquid moving at high speed through a gas, typically air. As this high speed stream moves through lower velocity air upon its exit from the nozzle, drag on the liquid stream by the air through which it moves disrupts the stream, breaking it into small droplets. Droplet size in such an atomizer is generally a result of the atomizer nozzle orifice diameter, the density of the gas into which the liquid stream exits, and the velocity difference between the liquid stream and the gas. In general, a larger orifice diameter produces a larger average droplet size, and decreased liquid pressure in the atomizer, which generally results in decreased liquid velocity for the same nozzle orifice size, also causes a larger average droplet size.

Air atomizers force liquid through a nozzle at relatively low speed, surrounded by a relatively high speed stream of gas, typically air. The interaction between the liquid and the air accelerates and disrupts the liquid, forming a spray of droplets. Again, the relative velocity difference between the liquid and the gas bring about atomization. Because air atomization allows separate control of both the flow rate of the liquid stream (via control of pressure and nozzle orifice size) and the air stream (via control of air pressure), this technique allows for better control of droplet size, and for the production of fine droplets suitable for forming microparticles using the processes described herein.

Centrifugal atomizers introduce liquid through a nozzle into a spinning cup, or onto a spinning disk. The liquid moves to the lip of the cup or the edge of the disk, from where it is thrown off in the form of streams or sheets that break up into fine droplets. Both flow rate of liquid through the nozzle and the rotational velocity of the cup or disk can be independently controlled to control droplet size, and the technique can be combined with the application of electrostatic charge to the already formed droplets to attract them to a grounded target substrate (such as the aqueous crosslinker solution). In addition, an air stream can be applied to the region around where the droplets are being thrown off in order to modify their direction, and move them more rapidly in the axial direction.

Electrostatic atomizers are charged, and expose the liquid to an electric field between the atomizer and the destination (e.g., the aqueous crosslinker solution). The liquid becomes charged, and this charge cause it to move through the electric field away from the atomizer, causing the liquid to stream and break up into droplets. For a given fluid, the droplet size can be varied by varying the electric field strength and/or the liquid flow rate.

Ultrasonic atomizers use an ultrasonic transducer vibrating at a high frequency to break a fluid stream passing nearby into droplets. Droplet size can be varied by varying the frequency of vibration of the transducers. Ultrasonic atomizers are generally only used with low-viscosity, Newtonian fluids.

The droplet size attainable with a particular atomizing technique is also dependent on the liquid being atomized, and in particular on the surface tension, viscosity, and density properties of the liquid.

In general, high surface tension tends to stabilize a liquid, helping to prevent its breakup into droplets. Liquids with higher surface tensions tend to have larger average droplet sizes after undergoing a particular atomization process. Surface tension of liquids can be decreased by the addition of surfactants, detergents, emulsifiers, or other surface active agents. In addition, surface tension tends to decrease with increasing temperature of the liquid.

In general, high viscosity tends to stabilize a liquid as well, leading to a larger average particle size. Lower viscosity liquids tend to atomize at a closer distance to the nozzle orifice than higher viscosity fluids, and to form smaller droplets.

In general, higher liquid density tends to cause liquids to resist acceleration, which is part of the process of droplet formation. As with surface tension and viscosity, higher density tends to result in higher average droplet particle size. Both density and viscosity are properties of the composition of the liquid, and are more difficult to vary than surface tension.

In a particular embodiment, the atomizer used is an air atomizer, in order to provide better control of both the direction of the spray of droplets, and the average size of the droplets and the particles formed from them.

As indicated in FIG. 1, the emulsion is atomized and forms a spray directed toward a aqueous solution of calcium chloride or other metal cation ionic crosslinking agent suitable for crosslinking at least some of the polysaccharide in the emulsion. The droplets form particles in the second aqueous solution as the result of this gelation or crosslinking. The particles contain a polysaccharide shell surrounding or encapsulating the hydrophobic additive. These particles are then removed from the second aqueous solution, and washed with a first aqueous washing liquid, such as distilled water. The washed particles can be dried and used, or can be suspended in a third aqueous solution, comprising one or more polysaccharides, in order to thicken the polysaccharide shell surrounding the hydrophobic additive, or to provide multiple layers of polysaccharide shell. The particles can then be removed from this third aqueous solution, and washed with a second aqueous washing liquid, such as distilled water.

Figure 2:
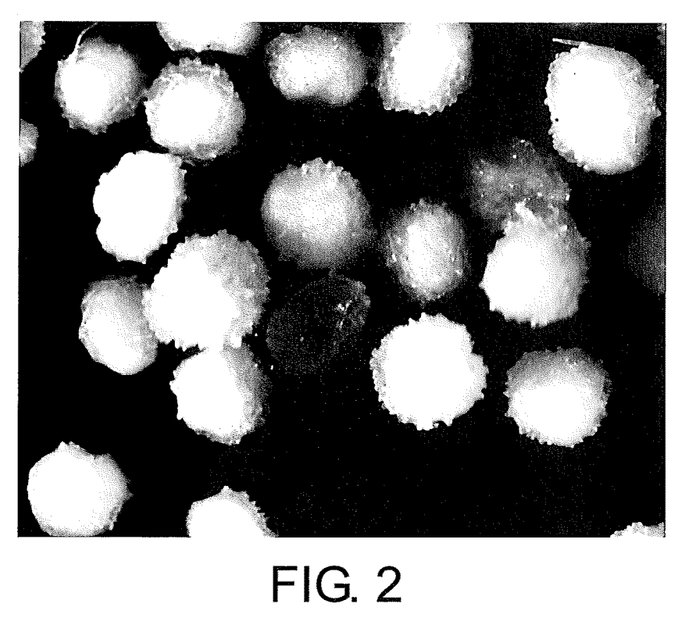
FIG. 2 is a photomicrograph from a scanning electron microscope of alginate-menthol microparticles as described herein.
Figure 3:
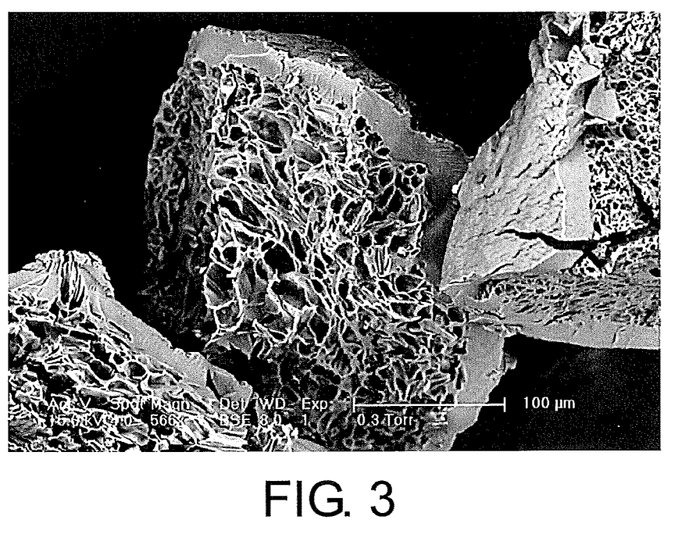
FIG. 3 is a photomicrograph from a scanning electron microscope of alginate menthol microparticles as described herein.

These washed particles can then be dried and incorporated into products in need of hydrophobic flavorants. Any suitable drying process can be used, and drying is generally carried out until the particles are in the form of a free-flowing powder. In a particular embodiment, the particles are dried until they have a moisture content of less than about 4% by weight. SEM photomicrographs of the particles prepared using alginate as the polysaccharide, menthol as the hydrophobic additive, and calcium chloride as the cross-linking agent are shown in FIGS. 2 and 3. The particles contained solid shells having a wall thickness ranging from about 15 µm to about 20 µm, and an average diameter of around 479±68 µm. Particularly visible in FIG. 3 is the random internal pore structure, surrounded by a solid shell. These pores are believed to form as the result of the sublimation of trapped menthol, which occurred during sample preparation for the SEM procedure. It will be understood that the particular polysaccharide, hydrophobic additive, and crosslinking agent used herein are exemplary, and may be varied in accordance with the disclosure herein.

Such products may include smoking articles, oral sensorial products, such as smokeless products containing tobacco and/or tobacco substitutes, in particular pouch products or chewing tobacco, food products, cosmetic formulations, nutraceutical products, and pharmaceutical products. In a particular embodiment, the products include smoking articles and smokeless products containing tobacco and/or tobacco substitutes.

Figure 4:
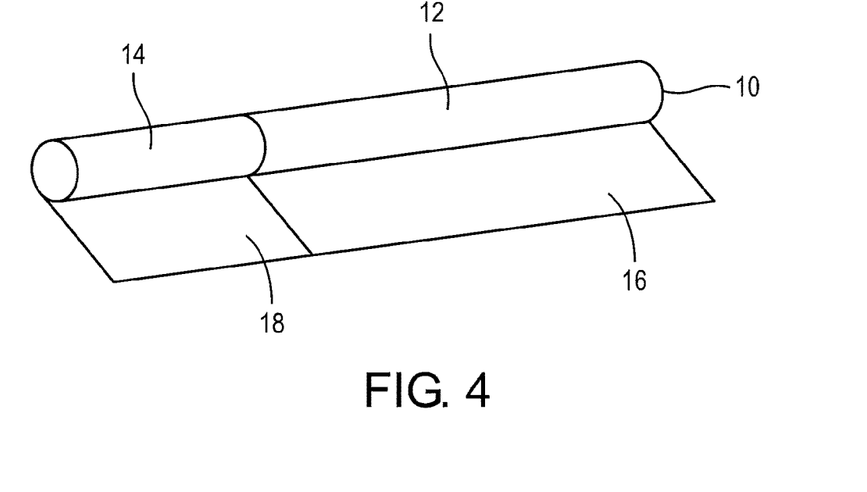
FIG. 4 is an illustration of a smoking article including the microparticles formed as described herein.

In a particularly preferred embodiment, a quantity of the microparticles formed as described herein are incorporated into a smoking article 10, such as a cigarette, as shown in FIG. 4. The cigarette may be a traditional cigarette, and may comprise a rod 12 of smokable material, such as tobacco or tobacco substitute, generally enclosed within a smokable wrapper, such as a paper wrapper. Optionally, the traditional cigarette can include a filter 14, which typically comprises a plug of fibrous material, such as cellulose acetate treated with triacetin, that is attached to the rod of smokable material via a tipping paper. In such products, the particles can be incorporated into the rod 12 of smokable material, the filter plug 14, the tipping paper 18, the wrapper 16, or a combination of these. Alternatively, the smoking article 10 may be a nontraditional cigarette. Non-traditional cigarettes can include, e.g., electrically heated cigarettes and/or fuel element heated cigarettes.

As used herein, the term "electrically heated cigarette" denotes an alternative to the traditional cigarette used in used in electrical smoking systems. Electrical smoking systems can generally include an electrically powered lighter and an electrically heated cigarette, which can be constructed to cooperate with the lighter, and which generally contains a rod or column of smoking composition. Electrical smoking systems generate only small amounts of sidestream smoke, and also permit consumers to suspend and reinitiate smoking as desired. Exemplary electrical smoking systems are described in U.S. Pat. Nos. 6,026,820; 5,988,176; 5,915,387; 5,692,526; 5,692,525; 5,666,976; 5,499,636; and 5,388,594. Other non-traditional cigarettes include those having a fuel element in the tobacco rod as described in U.S. Pat. No. 4,966,171.

As used herein, the term "smokable material" is intended to include tobacco (i.e., cut filler, tobacco powder, etc.), tobacco substitute materials (i.e., vegetable or plant products like shredded lettuce) or a mixture of both. Specific examples of smoking compositions may include, but are not limited to, flue-cured tobacco, Burley tobacco, Maryland tobacco, Oriental tobacco, rate tobacco, specialty tobacco, reconstituted tobacco, genetically modified tobacco, and blends thereof. Smoking compositions can include these materials in any suitable form, including, but not limited to: lamina, such as tobacco lamina; processed materials, such as volume expanded or puffed tobacco; ground materials, such as ground tobacco; processed stems, such as cut-rolled or cut-puffed tobacco stems, reconstituted material, such as reconstituted tobacco; and blends thereof.

When incorporated into the filter of a traditional or nontraditional cigarette, the particles can be dispersed through the filter material, e.g., in the interstices between fibers of a fibrous filter, or may be primarily located in a chamber or space in a "plug-space-plug" filter configuration, or a combination of these.

As indicated above, the filter rod 14 can be provided with an outer layer 18 (e.g., plug wrap or tipping paper) to help to maintain its shape. The outer layer 18 can comprise a wrapping of cigarette paper or other sheet material; the material of the outer layer can include any wrapping suitable for surrounding the filter material, including wrappers containing flax, hemp, kenaf, esparto grass, rice straw, cellulose, and so forth. Optional filler materials, flavor additives, and burning additives can be included in the cigarette wrapper. The wrapper can have more than one layer in cross-section, such as in a bi-layer wrapper disclosed in commonly-owned U.S. Pat. No. 5,143,098.

The resulting cigarettes can be manufactured to desired specifications using standard or modified cigarette making techniques and equipment. In a particular embodiment, cigarettes generally range in length from about 50 mm to about 120 mm, and range in circumference from about 15 mm to about 30 mm, preferably around 25 mm. The tobacco packing density is typically between about 100 $mg/cm^3$ and about 300 $mg/cm^3$, and preferably between about 150 $mg/cm^3$ and about 275 $mg/cm^3$.

If tobacco is present in the smoking composition, it is typically added, at least in part, as cut filler. Tobacco cut filler is normally in the form of shreds or strands, which have been cut or otherwise processed so that they have widths which are generally in the range from about 1/10 inch to about 1/40 inch, more particularly from about 1/10 inch to 1/20 inch. The lengths of the strands are generally in the range from about 0.25 inches to about 3 inches. The cigarettes may further comprise one or more flavorants or other additives (e.g., burn additives, combustion modifying agents, humectants, sweeteners, aerosol formers, coloring agents, binders, etc.).

Figure 5A:
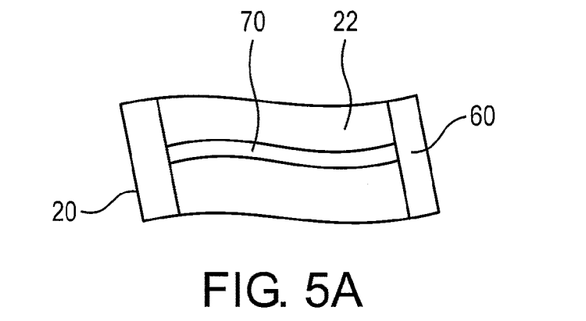
FIG. 5A is an illustration of an oral pouch product comprising microparticles formed as described herein.
Figure 5B:
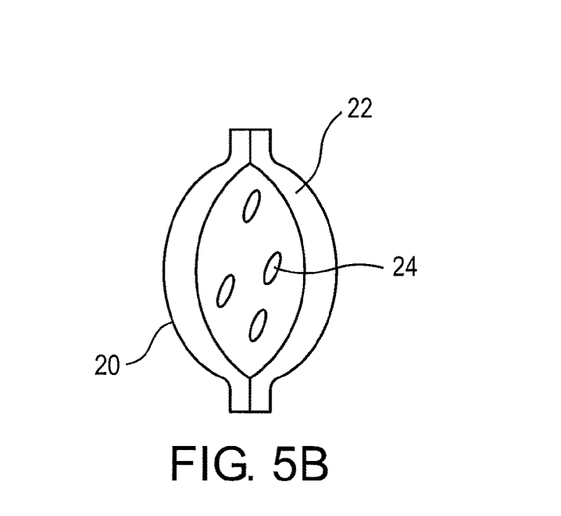
FIG. 5B is a cross-sectional view of the oral pouch product of FIG. 5A comprising microparticles formed as described herein

When the product is a smokeless oral sensorial product 20, such as a smokeless tobacco or tobacco-substitute pouch product as shown in FIGS. 5A and 5B, the particles can be added to the filling material 24, which can include tobacco or other plant material. In addition, in a pouch-type product, where the tobacco or other plant material is at least partially enclosed within a polymeric or paper wrapper 22, the particles can also or alternatively be incorporated within the wrapper material 22, e.g. by introducing them into the interstices between the fibers of a nonwoven polymeric material.

As shown in FIGS. 5A and 5B, the wrapper 22 is formed of a permeable or semi-permeable material, such that saliva can pass through the wrapper 22 to the interior of the pouch product 20, and the flavors and juices from the filling material 24 contained within the interior of the pouch product 20 can be drawn out of the pouch and into the user's mouth.

In a preferred embodiment, wrapper 22 comprises paper suitable for oral pouch products commonly referred to as "snus" or snuff. For example, the wrapper can be formed of a cellulose fiber material, such as tea bag material or materials typically used to form snus pouches. Desirably, the wrapper 22 is made from a material suitable for contact with food, such as materials used in packaging or handling foods. Preferred porous materials include, but are not limited to, films, gelatin, food casings, carrageenan, biopolymers, fabric (woven or non-woven), and/or paper such as filter paper, papers used to construct tea bags, coffee filters, and the like. Preferably, the material used to form the wrapper 22 has a neutral or pleasant taste or aroma. Preferably, the material used to form the wrapper 22 is selected to have desired properties of stain resistance, water permeability and/or porosity, and/or water insolubility.

Additionally, the materials used to form the wrapper 22 can be provided with predetermined levels for basis weight and/or wet strength in order to reduce occurrence of breakage of the wrapper 22 during manufacturing operations, storage and use. For example, a wrapper 22 can be provided with a basis weight of about 5 to about 25 $g/m^2$, such as 5-10, 10-15, 15-20, or 20-25 grams/meters$^2$ ($g/m^2$) depending upon the final usage requirements, and/or a wet tensile cross-direction (CD) strength of about 15 to about 75 N/m, such as 15-30, 30-45, 45-60, or 60-75 Newtons/meter (N/m) depending upon the final usage requirements. One exemplary material is a tea bag material with a basis weight of about 16.5 $g/m^2$ with a wet tensile CD strength of 68 N/m.

It is also noted that the thickness of the wrapper 22 can be varied to achieve desired levels of solubility through the wrapper 22. For example. the paper can be about 0.1 mm to about 0.125 mm thick or about 0.07 mm to about 0.08 mm thick.

In a preferred embodiment, the wrapper 22 maintains sufficient structural integrity during the time period that the wrapper 22 is used so that the filling material 24 is retained therein. In an embodiment, flavorants may be added to the wrapper 22 to provide additional flavor to the user. For example, peppermint oil can be applied to the wrapper 22 to deliver flavor during use.

Preferably, the oral pouch product 20 weighs about 0.1 g to about 5.0 g. These ranges for weight can be further restricted to (a) about 0.1 g to about 1.0 g, (b) about 1.0 g to about 2.0 g, (c) about 2.0 g to about 3.0 g, (d) about 3.0 g to about 4.0 g or (e) about 4.0 g to about 5.0 g. Also preferably, the oral pouch product 20 is about 0.25 inch to about 2.0 inches in width, about 0.25 inch to about 2.0 inches in length, and about 0.05 inch to about 2.0 inches thick. In an embodiment, the oral pouch product 20 is about 0.1 inch to about 2.0 inches in width, about 0.1 inch to about 2.0 inches in length and about 0.05 inch to about 1.0 inch thick.

The oral pouch product 20 may have a square, rectangular, quadrilateral, circular, moon, crescent, or oblong shape. The oral pouch product 20 can also be shaped like a half-moon or D-shape, or can take other shapes, including, without limitation oval, pouch-shape, rod-shape, cylindrical, tea leaf, tear drop, or hourglass shapes. In some embodiments, the pouch-shape can be similar to a ravioli or pillow shape. Other shapes may be utilized so long as the shapes fit comfortably and discreetly in a user's mouth.

Preferably, sharp corners are avoided as sharp corners may lead to oral discomfort. In a preferred embodiment, the wrapper 22 is sealed around one or more edges to contain the filling material 24 within the wrapper 22.

As shown in FIG. 5A, in one embodiment, the oral pouch product 20 comprises a longitudinal seam 70. The longitudinal seam 70 can comprise overlapping sections of the wrapper 22. Preferably, the oral pouch product 20 also includes at least one transverse seam 60. The transverse seams 60 can be formed such that the inner surface of the wrapper 22 contacts another section of the inner surface of the wrapper 22 to form the transverse seam 60 (shown in FIG. 5B).

Figure 6:
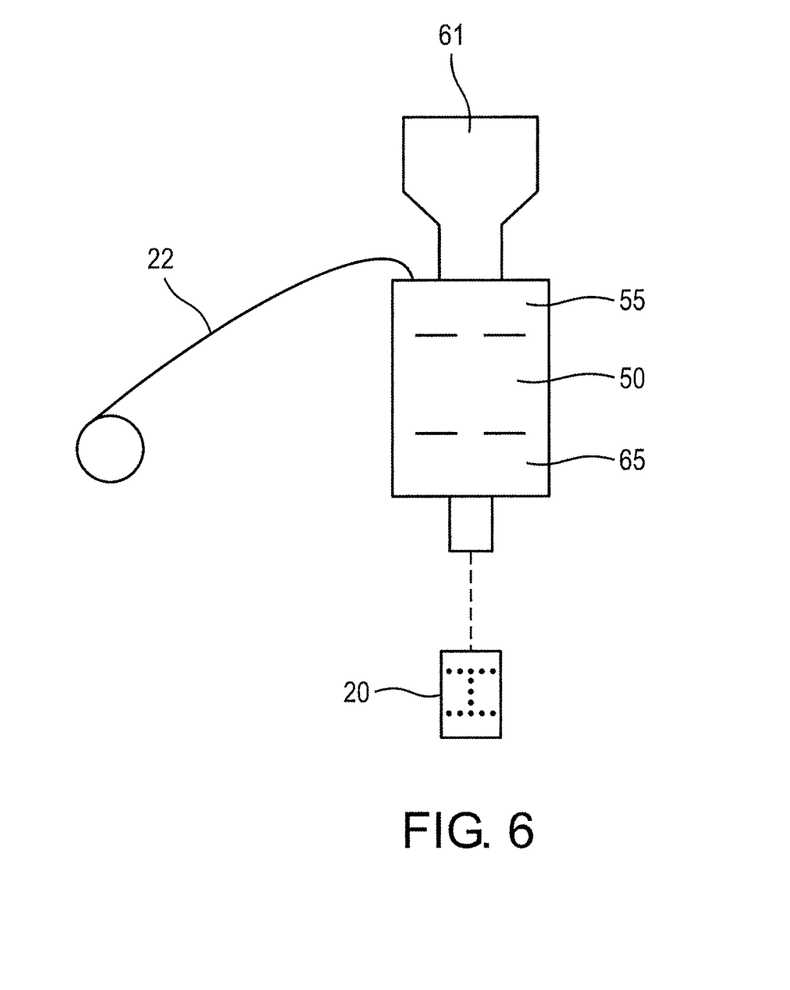
FIG. 6 is a schematic illustration of a machine for forming the pouch product of FIG. 5A.

As shown in FIG. 6, pouch forming operations can be executed by feeding a ribbon of wrapper 22 through a poucher machine 50, such as those manufactured by Merz Verpackungsmaschinen GmbH, Lich, Germany. In an embodiment, a wrapper 22 can be fed through the poucher machine 50. Such systems typically include a folding horn or shoe 55, a cutter 65 and a feeder 61, which cooperate to repetitively fold the ribbon of wrapper material into a tube, close-off and seal an end portion of the tube, feed a measured amount of pouch filling material into the closed-off tube to create a filled portion of the tube and seal and sever the filled portion of the tube to repetitively form individual pouches 20.

Preferably, the filling material is dispensed as a loose filling material. Most preferably, the filling material is feed into the pouches at a density of about 10 to about 50 pounds per cubic foot or about 15 to about 30 pounds per cubic foot. The filling material 24 can include microparticles as formed herein. In other embodiments, the microparticles can be applied to the wrapper 24 before and/or after formation of the oral pouch products 20.

Oral pouch products 20 are continuously formed by introduction of predetermined amounts of the filling material 24 into the tubular form above a transverse seam, formation of an upper transverse seam above the filling and cutting the tubular formation at locations along the length of the tubular formation to form individual pouches.

Sealing may be accomplished by any suitable sealing method, such as, for example, adhesive or by mutual sealing. Mutual sealing may be thermal or sonic. Preferably, sealing is accomplished by thermal sealing. Preferably, the inner web is paper with a flavor coating on one side and is sized to avoid becoming part of the longitudinal seam.

When used in cigarettes or smokeless oral sensorial products, the particles described herein provide excellent flavor stability, because migration and loss of volatile flavorants, such as menthol, is reduced. In addition, particularly in smokeless oral sensorial products, such as pouch products and chewing tobacco, the particles also provide for controlled or prolonged release of the flavorants, because the release profiles of the particles can be controlled by changing the amount or identity of the polysaccharide coating, the degree of crosslinking or gelation, and the like.

In this specification, the word "about" is often used in connection with numerical values to indicate that mathematical precision of such values is not intended. Accordingly, it is intended that where "about" is used with a numerical value, a tolerance of 10% is contemplated for that numerical value. In addition, the use of geometric terms is intended to include not only the precise geometric shapes, but also similar geometric shapes that may, for example, have rounded or chamfered corners, non-linear edges, and similar departures from strict geometrical definitions.

It will be understood that the foregoing description is of the preferred embodiments, and it, therefore, merely representative of the articles and methods of manufacturing the same. It can be appreciated that variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims. Any references mentioned herein are incorporated by reference into this disclosure in their entirety.

What is claimed is:

1. A method of making particles of encapsulated flavorants or chemesthetic agents, comprising:
   (a) forming a heated emulsion by heating a mixture to a temperature of about 60° C., the mixture comprising:
      (i) a first aqueous solution, comprising one or more polysaccharides; and
      (ii) a hydrophobic additive comprising menthol, which is liquefied;
   (b) atomizing said heated emulsion in an atomizer into droplets forming a spray directed toward a second aqueous solution comprising one or more metal cations;
   (c) introducing said droplets into the second aqueous solution, to form particles comprising a shell comprising one or more cross-linked polysaccharides and said additive encapsulated therein;
   (d) removing said particles from said second aqueous solution; and
   (e) drying said particles.

2. The method of claim 1, further comprising:
   (d2) introducing said particles removed from said second aqueous solution into a third aqueous solution, comprising one or more polysaccharides, for a time period sufficient to further coat said particles, thereby thickening the shell comprising one or more crosslinked polysaccharides or providing multiple layers of polysaccharide shell, and removed from said third aqueous solution.

3. The method of claim 2, further comprising:
   (d1) washing said particles removed from said second aqueous solution with a first aqueous washing liquid, prior to said introducing said particles in said third aqueous solution.

4. The method of claim 1, wherein the atomizer is selected from the group consisting of a pressure atomizer, an air atomizer, a centrifugal atomizer, an electrostatic atomizer, and an ultrasonic atomizer.

5. The method of claim 4, wherein the atomizer is an air-atomizer.

6. The method of claim 1, wherein said emulsion further comprises a surface active agent.

7. The method of claim 6, wherein the surface active agent comprises an emulsifier or wetting agent.

8. The method of claim 3, further comprising washing the particles removed from said third aqueous solution in a second aqueous washing liquid to obtain washed particles.

9. The method of claim 8, wherein said first and second aqueous washing liquids are water.

10. The method of claim 8, further comprising removing the second aqueous washing liquid from the washed particles to obtain dried particles.

11. The method of claim 1, wherein said one or more polysaccharides are selected from the group consisting of alginates, pectins, or carageenans.

12. The method of claim 1, wherein said one or more metal cations are selected from the group consisting of monovalent metal cations, divalent metal cations, and trivalent metal cations.

13. The method of claim 12, wherein said monovalent metal cations are potassium cations, said divalent metal cations are calcium cations, and said trivalent metal cations are aluminum cations.

14. The method of claim 1, wherein said particles have an average diameter ranging between about 400 μm and about 550 μm.

15. The method of claim 14, wherein said particles have an average diameter of about 479 μm.

16. The method of claim 1, wherein said particles comprise a solid shell surrounding an interior comprising said hydrophobic additive.

17. The method of claim 16, wherein said solid shell has a thickness ranging between about 15 μm and about 20 μm.

18. The method of claim 1, wherein said hydrophobic additive comprises one or more flavorants or chemesthetic agents.

19. A method of making a smoking article comprising:
   (1) producing particles according to the method of claim 1;
   (2) introducing said particles into a filter, or into a rod comprising a smoking composition, or both; and
   (3) forming said filter or rod of smoking composition into a smoking article.

20. A method of making particles of encapsulated menthol, comprising:
   (a) forming a heated emulsion, the emulsion consisting of:
      (i) a first aqueous solution, comprising one or more polysaccharides; and
      (ii) menthol;
   (b) atomizing said heated emulsion in a pressure atomizer into droplets forming a spray directed toward a second aqueous solution comprising one or more metal cations;
   (c) introducing said droplets into the second aqueous solution, to form particles comprising a shell comprising one or more cross-linked polysaccharides and said menthol encapsulated therein;
   (d) removing said particles from said second aqueous solution;
   (e) washing said particles removed from said second aqueous solution with a first aqueous washing liquid;
   (f) introducing said particles removed from said second aqueous solution into a third aqueous solution, comprising one or more polysaccharides, for a time period sufficient to further coat said particles, thereby thickening the shell comprising one or more crosslinked polysaccharides or providing multiple layers of polysaccharide shell,
   (g) removing said particles from said third aqueous solution; and
   (h) drying said particles,
   wherein said particles comprise a solid shell surrounding an interior comprising said menthol.

21. The method according to claim 20, wherein said solid shell has a thickness ranging between about 15 μm and about 20 μm.

22. The method according to claim 20, wherein the heated emulsion is formed by heating the mixture to a temperature of about 60° C.

23. A method of making particles of encapsulated flavorants or chemesthetic agents, comprising:
   (a) forming an emulsion comprising:

(i) a first aqueous solution, comprising one or more polysaccharides; and
(ii) a hydrophobic additive consisting of menthol;
(b) atomizing said emulsion in a pressure atomizer into droplets forming a spray directed toward a second aqueous solution comprising one or more metal cations;
(c) introducing said droplets into the second aqueous solution, to form particles comprising a shell comprising one or more cross-linked polysaccharides and said menthol encapsulated therein;
(d) removing said particles from said second aqueous solution; and
(e) drying said particles.

* * * * *